US011440680B2

(12) United States Patent
Talke et al.

(10) Patent No.: US 11,440,680 B2
(45) Date of Patent: Sep. 13, 2022

(54) TETHER MANAGEMENT SYSTEM FOR A TETHERED UAV

(71) Applicant: United States Government as represented by the Secretary of the Navy, San Diego, CA (US)

(72) Inventors: Kurt Arthur Talke, San Diego, CA (US); Nicholas Charles Stroumtsos, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 365 days.

(21) Appl. No.: 16/874,026

(22) Filed: May 14, 2020

(65) Prior Publication Data

US 2021/0009285 A1 Jan. 14, 2021

Related U.S. Application Data

(60) Provisional application No. 62/872,170, filed on Jul. 9, 2019.

(51) Int. Cl.
*B64C 39/02* (2006.01)
*B64F 1/00* (2006.01)
(Continued)

(52) U.S. Cl.
CPC ............ *B64F 1/362* (2013.01); *B64C 39/022* (2013.01); *B66D 1/36* (2013.01); *B66D 1/40* (2013.01);
(Continued)

(58) Field of Classification Search
CPC .... B64F 1/362; B64F 3/02; B64F 3/00; B64C 39/022; B64C 2201/027; B64C 39/024;
(Continued)

(56) References Cited

U.S. PATENT DOCUMENTS 2,451,244 A * 10/1948 Rugg ........................ B64D 3/00
33/300
2,453,857 A * 11/1948 Platt ........................ B64F 1/04
244/154

(Continued)

OTHER PUBLICATIONS

Kiribayashi, Seiga et al.; Position Estimation of Tethered Micro Unmanned Aerial Vehicle by Observing the Slack Tether; 2017 IEEE International Symposium on Safety, Security and Rescue Robotics (SSRR); Oct. 11-13, 2017.

(Continued)

*Primary Examiner* — Yonel Beaulieu
(74) *Attorney, Agent, or Firm* — Naval Information Warfare Center, Pacific; Kyle Eppele; James Eric Anderson

(57) ABSTRACT

A UAV tether management system comprising: a tether-wound spool rotatably mounted on a base station, a free-pivoting angle arm, and an angle arm encoder, wherein the tether is configured to transfer power from the base station to the UAV while the UAV is in flight, and the angle arm comprises a tether guide mounted to a proximal end of the angle arm such that the tether passes through the tether guide as the tether pays out of, or is taken up by, the spool, wherein the angle arm further comprises a counter weight mounted to a distal end of the angle arm such that a center of mass of the angle arm is aligned with the spool's axis of rotation, and wherein the angle arm encoder is configured to measure an offset angle of the angle arm.

20 Claims, 8 Drawing Sheets

(51) Int. Cl.
*B64F 1/36* (2017.01)
*B66D 1/74* (2006.01)
*H02G 11/02* (2006.01)
*H02G 11/00* (2006.01)
*B66D 1/36* (2006.01)
*B66D 1/40* (2006.01)

(52) U.S. Cl.
CPC ......... *B66D 1/7447* (2013.01); *B66D 1/7489* (2013.01); *H02G 11/003* (2013.01); *H02G 11/02* (2013.01); *B64C 2201/027* (2013.01)

(58) Field of Classification Search
CPC .. B64C 39/02; B66D 1/36; B66D 1/40; B66D 1/7447; B66D 1/7489; B66D 1/00; H02G 11/003; H02G 11/02; H02G 11/00
See application file for complete search history.

(56) References Cited

U.S. PATENT DOCUMENTS

| | | | | |
|---|---|---|---|---|
| 4,500,056 | A * | 2/1985 | Della-Moretta | B62D 53/0864 244/137.4 |
| 5,338,199 | A * | 8/1994 | Euer | F41J 9/10 434/14 |
| 7,263,939 | B1 * | 9/2007 | Phillips | B64C 37/02 114/102.16 |
| 9,688,404 | B1 * | 6/2017 | Buchmueller | B64D 1/12 |
| 11,193,556 | B1 * | 12/2021 | Endebrock | F16H 57/021 |
| 11,254,446 | B2 * | 2/2022 | Ratajczak | B64D 31/00 |
| 2005/0017129 | A1 * | 1/2005 | McDonnell | B64D 3/00 244/110 G |
| 2008/0108273 | A1 * | 5/2008 | Alden | G09F 19/08 446/34 |
| 2013/0043450 | A1 * | 2/2013 | Kommer | B66D 3/10 254/391 |
| 2017/0240277 | A1 * | 8/2017 | Molnar | B64F 3/02 |
| 2017/0327091 | A1 * | 11/2017 | Capizzo | H02J 7/0013 |
| 2019/0071176 | A1 * | 3/2019 | von Flotow | B66D 1/46 |
| 2021/0009285 | A1 * | 1/2021 | Talke | B64C 39/024 |
| 2021/0012163 | A1 * | 1/2021 | Li | G06V 20/17 |
| 2021/0027828 | A1 * | 1/2021 | Yamazaki | H01L 27/1251 |
| 2021/0171217 | A1 * | 6/2021 | Brown | B63G 11/00 |
| 2021/0241636 | A1 * | 8/2021 | Yu | B64C 39/022 |
| 2021/0354791 | A1 * | 11/2021 | Sheldon-Coulson | F03B 13/14 |
| 2022/0208424 | A1 * | 6/2022 | Matthews | H01F 3/14 |

OTHER PUBLICATIONS

Zikou, Lida et al.; The Power-over-Tether system for powering small UAVs: Tethering-Line Tension Control Synthesis; 2015 23rd Mediterranean Conference on Control and Automation (MED); Jun. 16-19, 2015.

* cited by examiner

TETHER MANAGEMENT SYSTEM FOR A TETHERED UAV

CROSS-REFERENCE TO RELATED APPLICATION

This application claims the benefit of prior U.S. Provisional Application No. 62/872,170, filed 9 Jul. 2019, titled "AUTONOMOUS TETHER MANAGEMENT SYSTEM FOR A SLACK HANGING TETHER FOR A UAV" (Navy Case #110851).

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 110851.

BACKGROUND OF THE INVENTION

Unmanned Aerial Vehicles (UAVs) and autonomous vehicle systems are increasingly being used for a wide variety of military missions. Among the many uses possible, these systems permit remote observation and surveillance of their surroundings without the need for constant human monitoring or control. Smaller UAV's, such as those categorized in Group 1 of the Department of Defense's Unmanned Aerial System, have the advantage of being easily transportable and do not require a large support footprint or large numbers of personnel to support their operation, but they are limited in their on-station time due to their small size and battery or fuel capacity.

As a means to overcome the limited on-station time problem for UAV's, the use of a tether linked to the UAV with a ground-based base station is known in the art. This allows the UAV to receive a continuous electrical power source from the base station, and also permits the UAV to send data to the base station without interference, for example by adversary electronic jamming.

The large majority of tethered UAV solutions proposed in the art involve the use of a so-called "taut-tether" methodology, which maintains a tension on the tether strung between the base station and the UAV. But the taut-tether methodology has limitations in certain scenarios such as when the base station is a ship at sea, which is subject to heaving, pitching, and rolling motions, especially in higher sea states. Additional challenges (e.g., wind loading, harmonic loading, and oscillations) to taut-tether flight present themselves when the base station is underway. Maintaining a taut tether in such environmental conditions imparts adverse dynamic stresses on the tether, may result in the UAV being subject to being pulled in a downward direction, and may cause the tether to separate from the UAV.

SUMMARY

Described herein is a UAV tether management system comprising, in one embodiment: a spool, a tether, an angle arm, and an angle arm encoder. The spool has an axis of rotation and a slip ring. The spool is configured to be rotatably mounted on a base station. The tether is wound on the spool and is configured to transfer power from the base station via the slip ring to the UAV while the UAV is in flight. The angle arm is mounted to the spool such that the angle arm is free to pivot around the axis of rotation. The angle arm comprises a tether guide mounted to a proximal end of the angle arm such that the tether passes through the tether guide as the tether pays out of, or is taken up by, the spool. The angle arm further comprises a counter weight mounted to a distal end of the angle arm such that a center of mass of the angle arm is aligned with the axis of rotation. The angle arm encoder is mounted to the spool and configured to measure an offset angle of the angle arm with respect to a reference plane that is parallel to the axis of rotation.

Another embodiment of the UAV tether management system may be described as comprising a spool, a spool motor, a tether, an angle arm assembly, and an angle arm encoder. The spool has an axis of rotation and a slip ring and is configured to be rotatably mounted on a base station. The spool motor is operatively coupled to the spool and configured to cause the spool to pay out or take up the tether, which is wound on the spool. The tether is configured to transfer power and communication signals between the base station to the UAV via the slip ring while the UAV is in flight. The angle arm assembly is mounted to the spool such that the angle arm assembly is free to pivot around the axis of rotation. The angle arm assembly comprises a pair of angle arms and a tether guide. Each angle arm has a proximal end and a distal end to which a counter weight is mounted such that the angle arm assembly's center of mass is aligned with the spool's axis of rotation. The tether guide is mounted between the proximal ends of the angle arms such that the tether passes through the tether guide as the tether pays out of, or is taken up by, the spool. The angle arm encoder is mounted to the spool and is configured to measure an offset angle of the angle arm with respect to a reference plane that is parallel to the axis of rotation.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed system below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
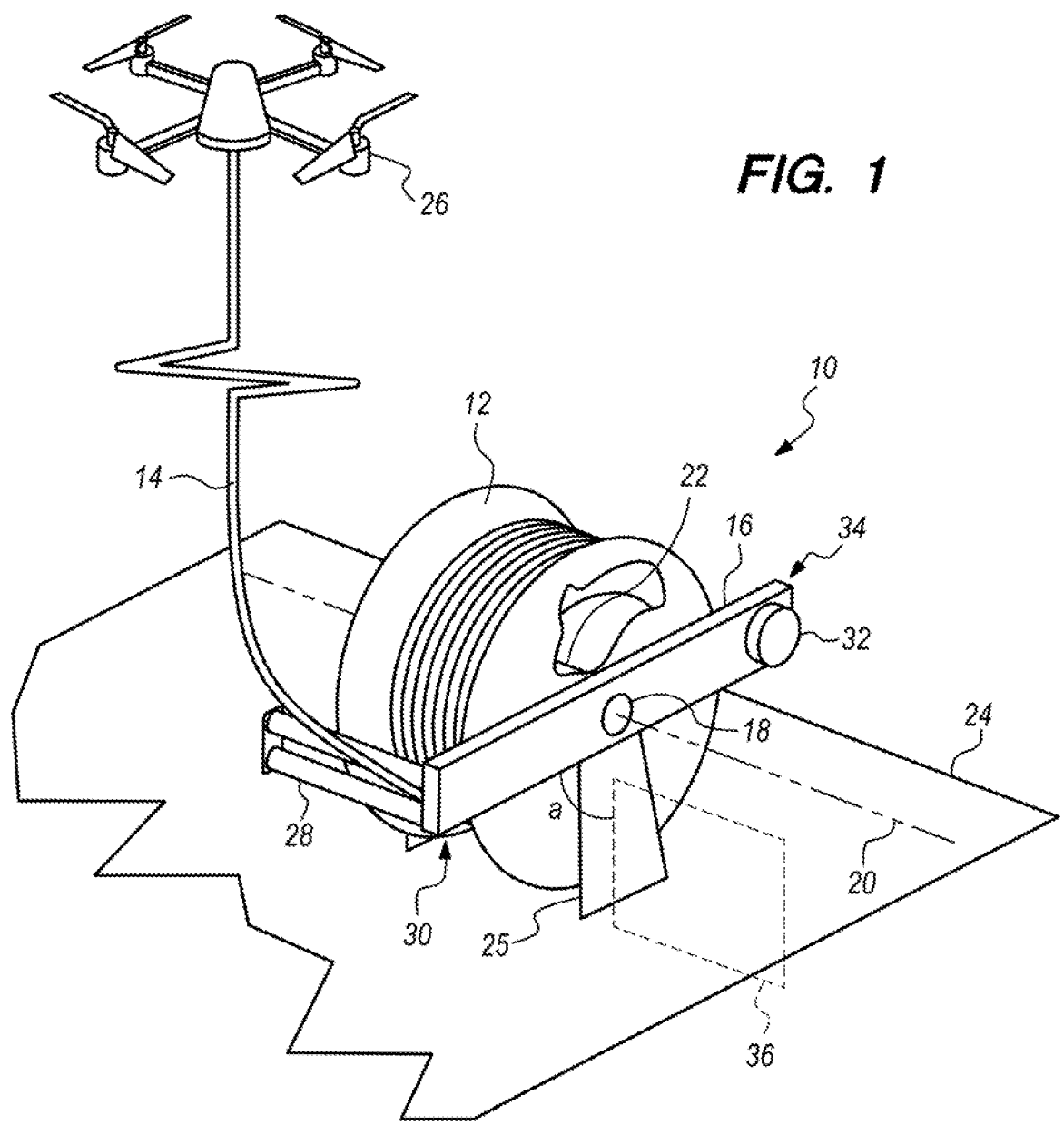
FIG. 1 is a perspective-view illustration of a UAV tether management system.

FIG. 1 is a perspective view illustration of a UAV tether management system 10 that comprises, consists of, or consists essentially of a spool 12, a tether 14, an angle arm 16, and an angle arm encoder 18. The spool 12 has an axis of rotation 20 and a slip ring 22 and is rotatably mounted on a base station 24 via a frame 25. The tether 14, which is wound on the spool 12, is configured to transfer power and signals from the base station 24 via the slip ring 22 to the UAV 26 while the UAV 26 is in flight. The tether 14 may also be used to transfer communications signals between the base station 24 and the UAV 26. The angle arm 16 is mounted to the spool 12 such that the angle arm 16 is free to pivot around the axis of rotation 20. The angle arm 16 comprises a tether guide 28 mounted to a proximal end 30 of the angle arm 16 such that the tether 14 passes through the tether guide 28 as the tether 14 pays out of, or is taken up by, the spool 12. The angle arm also comprises a counter weight 32 mounted to a distal end 34 of the angle arm 16 such that the angle arm 16's center of mass is aligned with the axis of rotation 20. The angle arm encoder 18 is mounted to the spool 12 and configured to measure an offset angle a of the angle arm 16 with respect to a reference plane 36 that is parallel to the axis of rotation 20.

Figure 2:
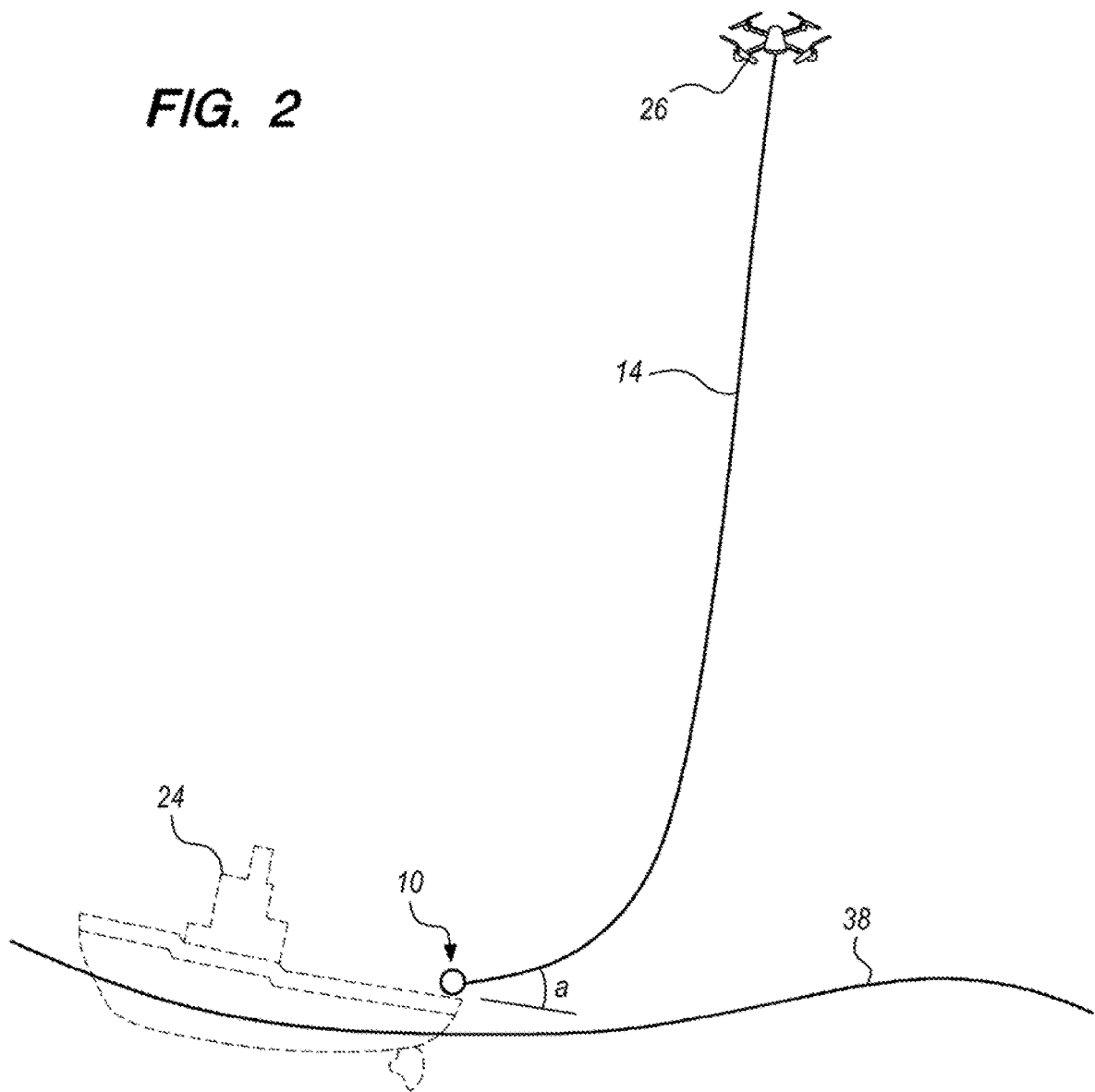
FIG. 2 is an illustration of an operational scenario involving a UAV tether management system being used at sea.

FIG. 2 is an illustration of an operational scenario involving the UAV tether management system 10 being used at sea. In this embodiment, the base station 24 is a water vessel floating on a sea surface 38. Different embodiments of the UAV tether management system 10 may be constructed to allow the UAV 26 to maintain its position even as the base station 24 heaves, pitches, yaws, and rolls in any sea state due to the UAV tether management system 10's ability to keep slack in the tether 14. When flying in a "slack" non-taut configuration, it may be desirable to measure the tether angle of departure. It is to be understood that that the UAV tether management system 10 is not limited to any particular use scenario, but may be used at sea, on land, or even under water. The UAV tether management system 10 may be used to measure the offset angle a of the angle arm 16 with respect to a reference plane 36. The offset angle a corresponds to the tether-departure angle (i.e., the angle at which the tether departs from the spool 12). This allows an appropriate amount of tether to be paid out or taken in to allow for a hanging, or non-taut, tether 14 that is not so long as to contact the sea surface 38 or so taut that the heaving motion of the ocean causes the tether 14 to pull the UAV 26 out of position. The paying out and taking in of the tether 14 may be performed autonomously. In many embodiments, the UAV tether management system 10 allows for a direct physical angle measurement via measurement of the offset angle a, without the need for optics. The angle arm 16 is counterweighted such that it is able to pivot freely as the tether 14 is paid out or taken in.

The angle arm 16 is designed to freely pivot about the axis of rotation 20 such that the contact of the tether 14 on the tether guide 28 causes the angle arm 16 to move up or down depending on the tautness of the tether 14 as it is paid out or taken in by the spool 12. As the angle arm 16 moves, the offset angle a of the angle arm 16 with respect to the reference plane 36 changes. The reference plan 36 may be any plane that is parallel to the axis of rotation 20.

Figure 3:
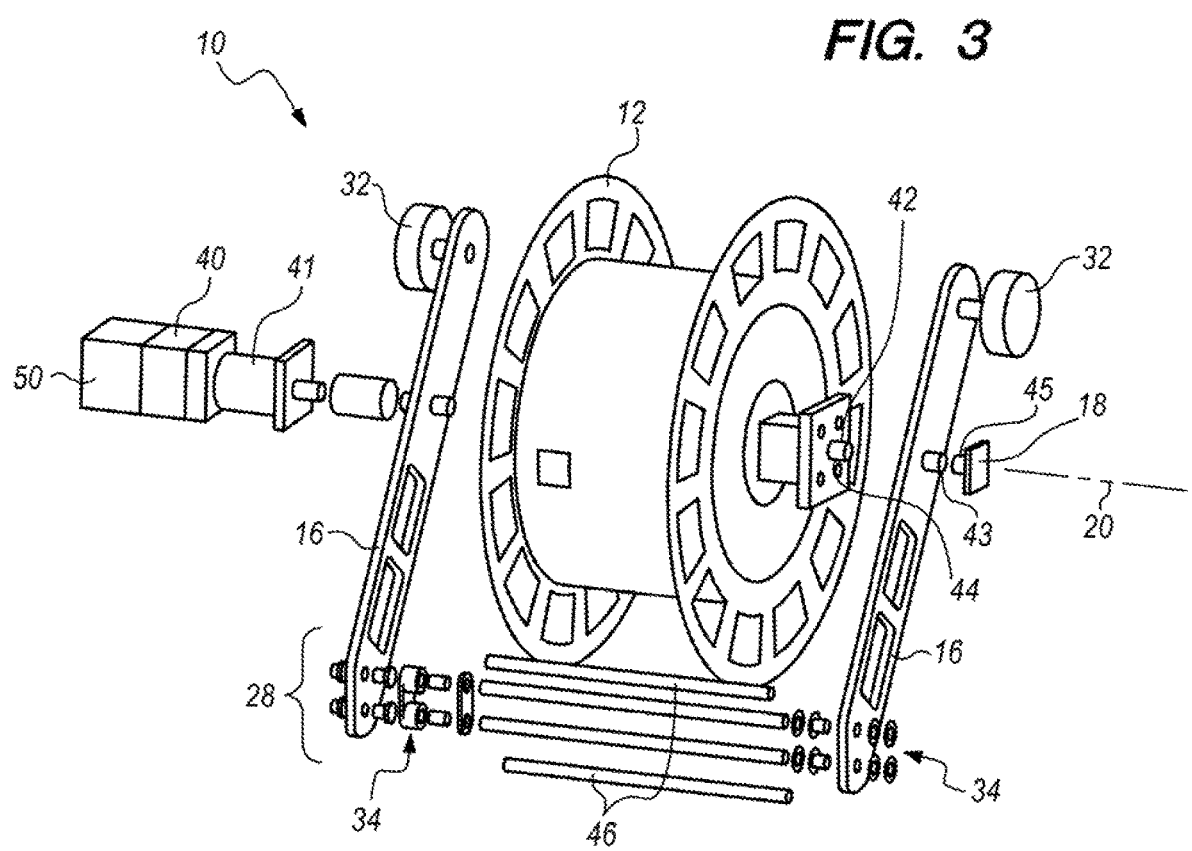
FIG. 3 is an expanded-view illustration of a UAV tether management system.

FIG. 3 is an expanded view of an embodiment of the UAV tether management system 10 that further comprises a spool motor 40 operatively coupled to the spool 12 and configured to cause the spool 12 to pay out or take up the tether 14. In the embodiment of UAV tether management system 10 shown in FIG. 3, the spool motor 40 is a smart motor that comprises a gear box 41 and an internal motor encoder 50. Also inn this embodiment, the angle arm encoder 18 is a magnetic encoder comprising a chip 43 and a housing 45 mounted to the angle arm 16 and a magnet 42 pressed into an end of a stationary shaft 44 that is connected to the frame 25, such as is shown in FIG. 1, and aligned with the rotation axis 20. In this embodiment of the UAV tether management system 10, the tether guide 28 comprises two rollers 46 having parallel axes of rotation coupled between the distal ends 34 of a pair of angle arms 16.

Figure 4:
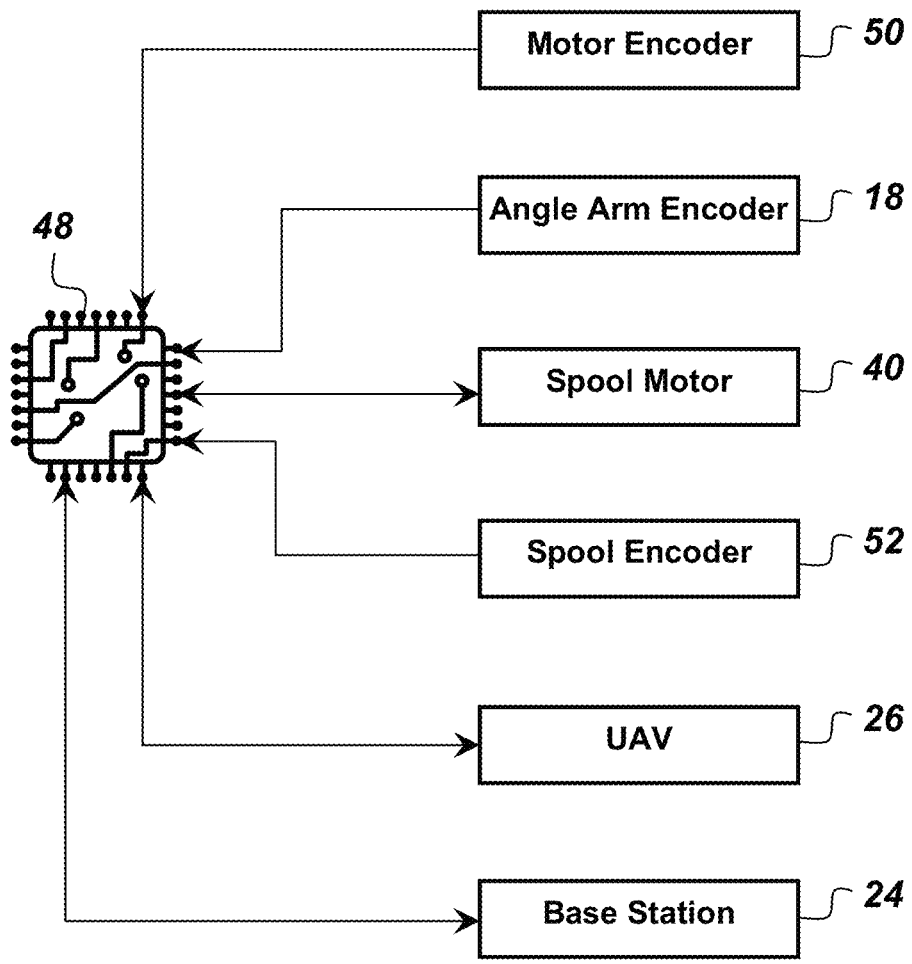
FIG. 4 is a communication protocol diagram of a UAV tether management system.

FIG. 4 is a communication protocol diagram of an embodiment of the UAV tether management system 10 that comprises a controller 48 that is operatively coupled to the angle arm encoder 18 and the spool motor 40. The controller 48 may be configured to determine the offset angle a of the angle arm 16 relative to the reference plane 36 based on an output from the angle arm encoder 18. In one embodiment, the controller 48 may also be configured to the electrical current load of the spool motor 40 and determine a tension on the spool 12 based on the spool motor 40 current measurements. The controller 48 may be further configured to adjust the offset angle a by instructing the motor 40 to pay out or take in the tether 14 thereby controlling the departure angle of the tether 14 and allowing for non-taut, hanging-tether flight of the UAV 26. The UAV tether management system 10 may be used with a control approach that uses a catenary model specifically developed for heave tolerance such as is described in the article, "Catenary Tether Shape Analysis for a UAV-USV Team" by Kurt A. Talke et al., 2018 IEEEJRSJ International Conference on Intelligent Robots and Systems (IROS) Madrid, Spain, Oct. 1-5, 2018, which article is incorporated by reference herein in its entirety. The controller 48 may also be configured to actively monitor global positioning system (GPS) coordinates, or the like, from both the base station 24 and the UAV 26. Some embodiments of the UAV tether management system 10 may further comprise a motor encoder 50 and a spool encoder 52, both of which may be communicatively coupled to the controller 48. Based on an output from the optional motor encoder 50, the controller 48 may be configured to determine the length of the deployed tether 14. Based on an output from the optional spool encoder 52, the controller 48 may be configured to determine displacement of a torsion spring 54 (shown in FIG. 5) to determine an estimate of the tension of the deployed tether 14.

Figure 5:
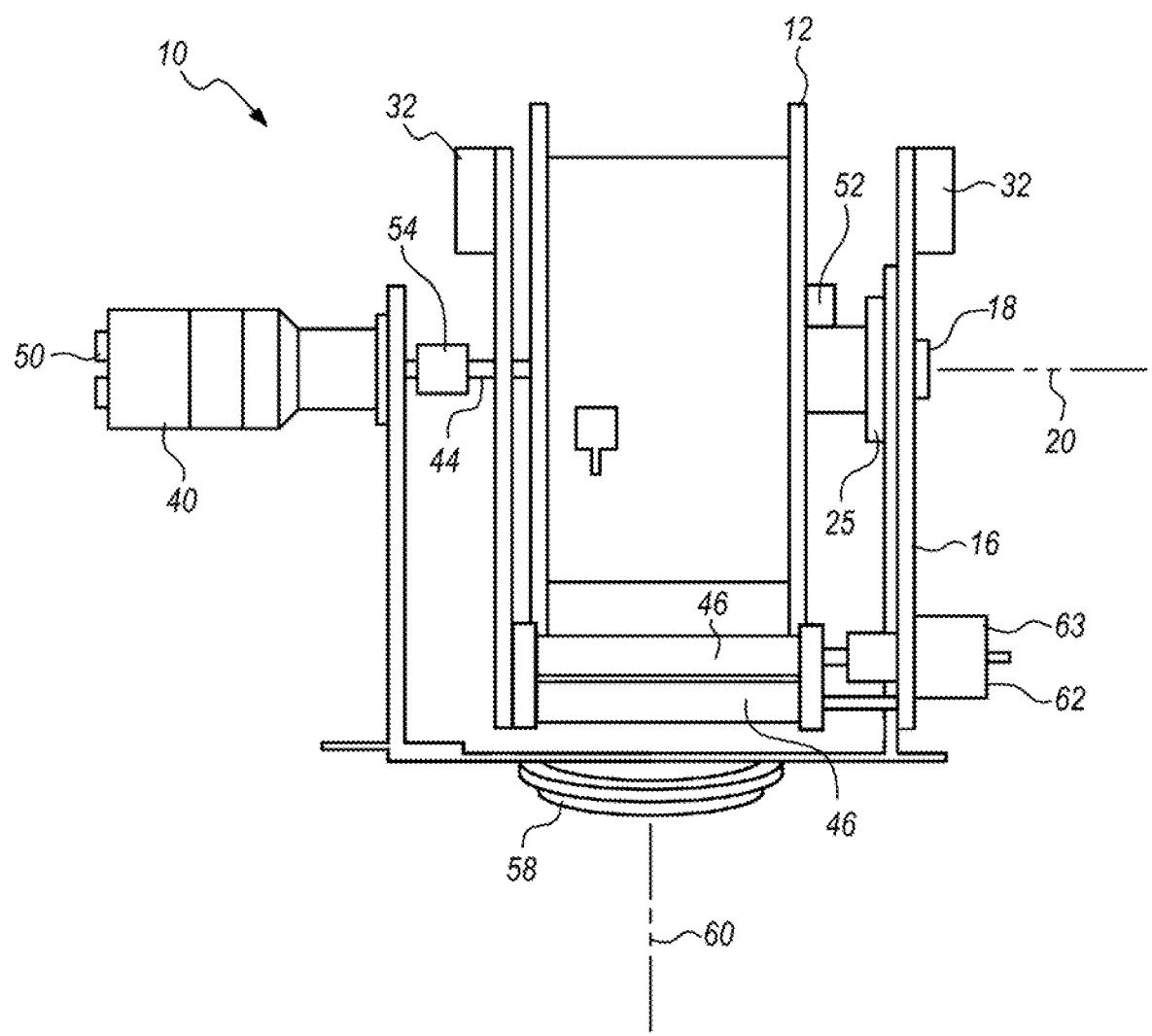
FIG. 5 is a front-view illustration of a UAV tether management system.

FIG. 5 is a front-view illustration of an embodiment of the UAV tether management system 10 that further comprises the torsional spring 54 that is operatively coupled between the spool motor 40 and the spool 12. Tether tension may be determined by measuring rotational displacement across the torsional spring 54. This embodiment also shows the spool encoder 52 that is operatively coupled to the frame 25 and configured to measure rotational displacement of the spool 12 with respect to the frame 25. Also shown in this embodiment is a turntable 58 that is configured to be mounted between the base station 24 (such as shown in FIGS. 1 and 2) and the spool 12 such that the spool 12 can freely rotate about a turntable axis 60 that is orthogonal to spool 12's the axis of rotation 20. The tether guide 28 of the embodiment of the UAV tether management system 10 shown in FIG. 5 further comprises a pair of rollers 46 where one of the rollers 46 is coupled to a roller motor 62 that is configured to rotate the coupled roller 46 so as to maintain tether tension between the spool 12 and the rollers 46. A roller motor encoder 63 may also be used in conjunction with the roller motor 62 to ensure that the motor-coupled roller 46 rolls the proper amount with respect to the spool 12 so as to avoid slipping of the tether 14 through the rollers 46. Optionally, the pair of rollers 46 may be spring mounted with respect to each other so as to pinch the tether 14 between the rollers 46. In another embodiment, the rollers 46 may be rigidly mounted with respect to each other but still close enough to pinch the tether 14 between the rollers 46.

Figure 6:
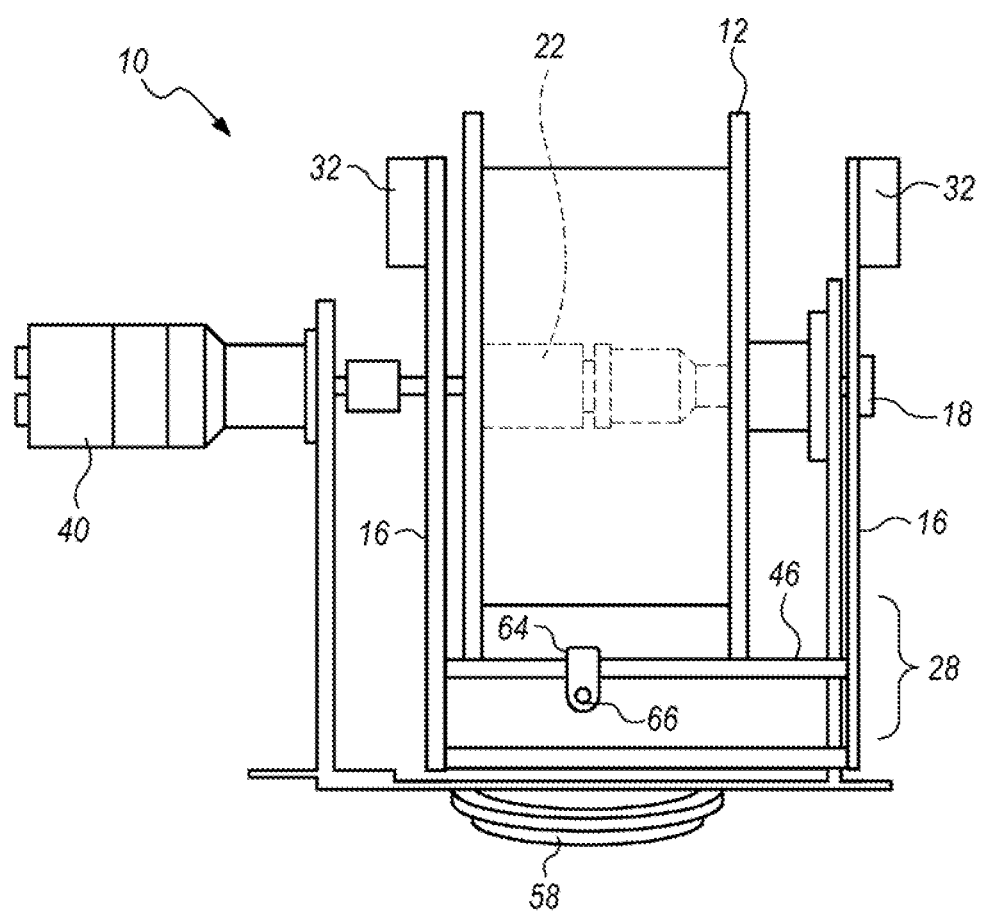
FIG. 6 is a front-view illustration of a UAV tether management system.

FIG. 6 is a front-view illustration of an embodiment of the UAV tether management system 10, in which the tether guide 28 comprises a follower 64 slidingly mounted to the roller 46 and having a via 66 therein. In this design, the tether 14, when mounted to the spool 12, would pass through the via 66 as it is paid out or taken in by the spool 12. The follower 64 in this embodiment, is free to rotate about the roller 46 to which it is attached.

Figure 7:
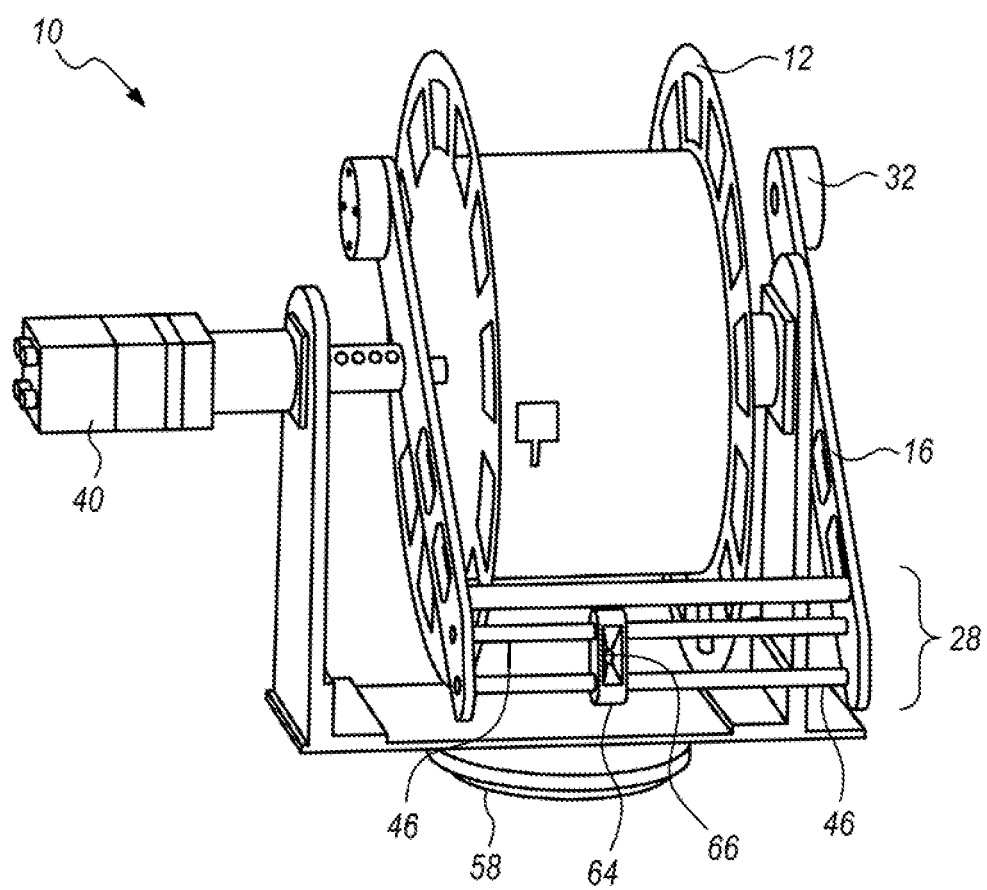
FIG. 7 is a perspective-view illustration of a UAV tether management system.

FIG. 7 is a perspective-view illustration of an embodiment of the UAV tether management system 10 where the follower 64 is slidingly mounted between two rollers 46. In this embodiment, the tether 14 would be disposed within the via 66 such that any vertical motion of the tether 14 will cause the angle arm 16 to pivot about the axis of rotation 20, and any horizontal motion causes the follower 64 to slide horizontally over the rollers 46. For example, the follower 64 may be pushed by the tether 14 horizontally until the follower 64 comes in contact with one of the angle arms 16 at which point, the spool 12 would then rotate about the turntable axis 60. In another embodiment, the follower 64 may be fixed to the rollers 46 such that no horizontal movement of the follower 64 is allowed due to side-to-side movement of the tether 14, and only rotation of the spool 12 about the turntable axis 60 is allowed.

Figure 8:
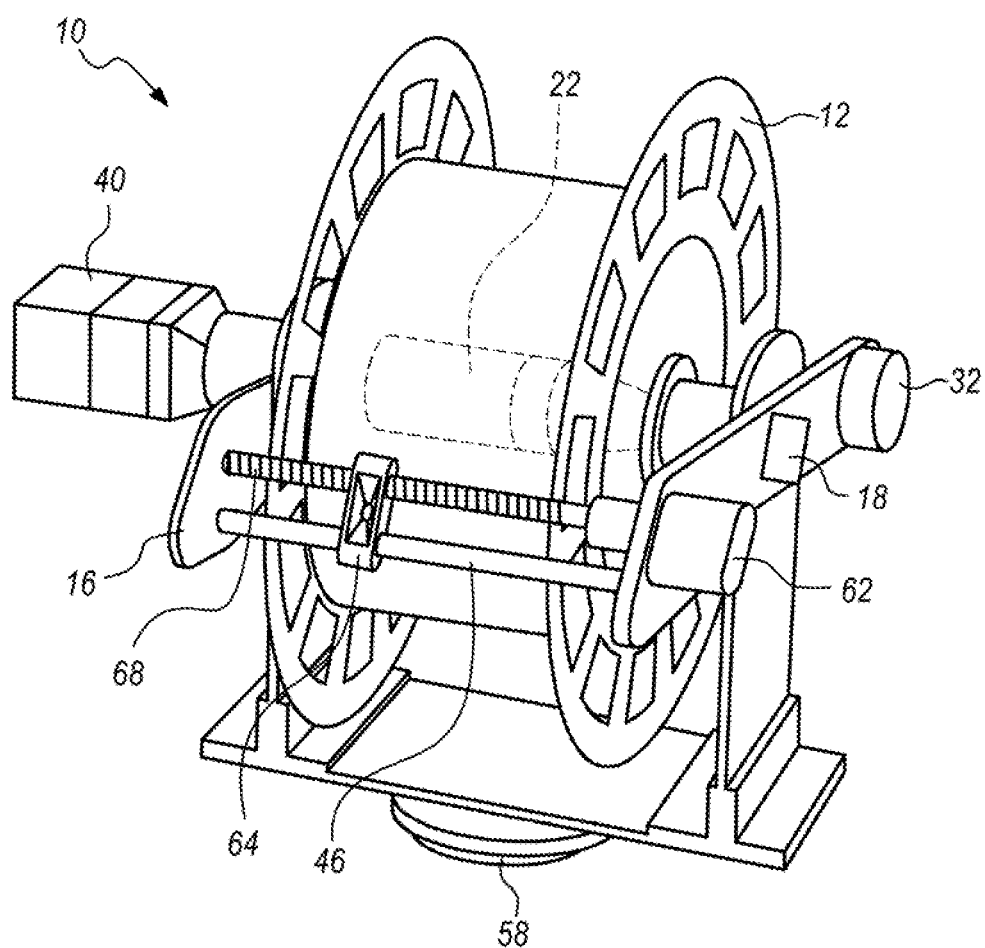
FIG. 8 is a perspective-view illustration of a UAV tether management system.

FIG. 8 is a perspective view illustration of the UAV tether management system 10 where the tether guide 28 further comprises a cross-threaded winding screw 68, the follower 64, and a roller 46. In this embodiment, the follower 64 is coupled to the cross-threaded winding screw 68 and the roller 46. The cross-threaded winding screw 68 is coupled to the roller motor 62 such that when the roller motor 62 spins the cross-threaded winding screw 68, the follower 64 travels horizontally across the cross-threaded winding screw 68 as it slides over, and is guided by, the roller 46. The cross-threaded winding screw 68 can be used to facilitate level winding of the tether 14 on the spool 12 as the tether 14 is taken in by the spool 12.

The UAV tether management system 10 may be used with a control approach that uses the position of the UAV 26 in reference to the base station 24 to control the length of the tether 14 to a specific length best suited for heave motion. The UAV tether management system 10 allows for a dynamic moving base station 24, such as an unmanned surface vehicle (USV). The ability of the UAV tether management system 10 to keep minimal tension in the tether 14 even while the base station 24 is dynamically moving with respect to the UAV 26 results in a tether management system that exerts less downward force on the UAV 26 than taut-line tether systems. The reduced downward force equates to reduced power consumption by the UAV 26.

From the above description of the UAV tether management system 10, it is manifest that various techniques may be used for implementing the concepts of the UAV tether management system 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the UAV tether management system 10 is not limited to the particular embodiments described herein, but is capable of many embodiments without departing from the scope of the claims.

We claim:

1. An unmanned aerial vehicle (UAV) tether management system comprising:
   a spool having an axis of rotation and a slip ring, wherein the spool is configured to be rotatably mounted on a base station;
   a tether wound on the spool, wherein the tether is configured to transfer power from the base station via the slip ring to the UAV while the UAV is in flight;
   an angle arm mounted to the spool such that the angle arm is free to pivot around the axis of rotation, wherein the angle arm comprises a tether guide mounted to a proximal end of the angle arm such that the tether passes through the tether guide as the tether pays out of, or is taken up by, the spool, and wherein the angle arm further comprises a counter weight mounted to a distal end of the angle arm such that a center of mass of the angle arm is aligned with the axis of rotation; and
   an angle arm encoder mounted to the spool and configured to measure an offset angle of the angle arm with respect to a reference plane that is parallel to the axis of rotation.

2. The UAV tether management system of claim 1, further comprising a spool motor operatively coupled to the spool and configured to cause the spool to pay out or take up the tether.

3. The UAV tether management system of claim 2, further comprising a torsional spring operatively coupled between the spool motor and the spool.

4. The UAV tether management system of claim 3, further comprising a spool encoder operatively coupled to the spool and configured to measure rotational displacement of a spool shaft with respect to a motor shaft.

5. The UAV tether management system of claim 4, further comprising a controller operatively coupled to the spool encoder, the spool motor, and the angle arm encoder.

6. The UAV tether management system of claim 5, further comprising a turntable mounted between the base station and the spool such that the spool can freely rotate about a turntable axis that is orthogonal to the axis of rotation.

7. The UAV tether management system of claim 6, wherein the tether and slip ring are further configured to transfer communication signals between the base station and the UAV.

8. The UAV tether management system of claim 7, wherein the tether guide comprises a roller.

9. The UAV tether management system of claim 8, wherein the tether guide further comprises a cross-threaded winding screw paired with the roller such that the tether is disposed between the roller and the cross-threaded winding screw.

10. The UAV tether management system of claim 8, wherein the tether guide further comprises a follower slidingly mounted to the roller and having a via therein, and wherein the tether is disposed within the via.

11. The UAV tether management system of claim 7, wherein the tether guide comprises a pair of rollers having parallel axes of rotation, and wherein the pair of rollers are spring mounted with respect to each other so as to pinch the tether between the rollers.

12. The UAV tether management system of claim 11, wherein one of the pair of rollers is shaft-coupled to a roller motor that is configured to rotate the coupled roller so as to maintain tether tension between the spool and the rollers.

13. The UAV tether management system of claim 7, wherein the tether guide comprises a pair of rollers having parallel axes of rotation and a follower slidingly mounted therebetween, wherein the follower comprises a via in which the tether is disposed such that any vertical motion of the tether will cause the angle arm to pivot about the axis of rotation, and any horizontal motion causes the follower to move horizontally.

14. The UAV tether management system of claim 7, wherein the tether guide comprises a pair of rollers having parallel axes of rotation and a follower mounted therebetween, wherein the follower comprises a via in which the tether is disposed such that any vertical motion of the tether will cause the angle arm to pivot about the axis of rotation, and any horizontal motion causes the spool to rotate about the turntable axis, wherein the tether guide further comprises a motor and lead/cross-threaded screw operably coupled to the follower for level winding as the tether is taken in by the spool.

15. An unmanned aerial vehicle (UAV) tether management system comprising:
   a spool having an axis of rotation and a slip ring, wherein the spool is configured to be rotatably mounted on a base station;
   a spool motor operatively coupled to the spool and configured to cause the spool to pay out or take up the tether;
   a tether wound on the spool, wherein the tether is configured to transfer power and communication signals between the base station to the UAV via the slip ring while the UAV is in flight;
   an angle arm assembly mounted to the spool such that the angle arm assembly is free to pivot around the axis of rotation, wherein the angle arm assembly comprises a pair of angle arms and a tether guide, wherein each angle arm has a proximal end and a distal end to which a counter weight is mounted such that a center of mass of the angle arm assembly is aligned with the axis of rotation, and wherein the tether guide is mounted between the proximal ends of the angle arms such that the tether passes through the tether guide as the tether pays out of, or is taken up by, the spool; and
   an angle arm encoder mounted to the spool and configured to measure an offset angle of the angle arm with respect to a reference plane that is parallel to the axis of rotation.

16. The UAV tether management system of claim 15, further comprising a controller operatively coupled to the angle arm encoder and the spool motor, wherein the controller is configured to:
   determine an angle of the angle arm assembly relative to the reference plane based on an output from the angle arm encoder;
   measure spool motor current and determine a tension on the spool based on the spool motor current measurements; and
   to adjust the angle of the angle arm assembly relative to the reference plane by paying out or taking in tether thereby controlling a departure angle of the tether and allowing for non-taut, hanging-tether flight of the UAV.

17. The UAV tether management system of claim 16, wherein the controller is further configured to receive global positioning system (GPS) coordinates from the base station and from the UAV.

18. The UAV tether management system of claim 17, further comprising: turntable mounted between the base station and the spool such that the spool can freely rotate about a turntable axis that is orthogonal to the axis of rotation.

19. The UAV tether management system of claim 18, wherein the tether guide comprises a pair of rollers having parallel axes of rotation.

20. The UAV tether management system of claim 19, wherein the tether guide further comprises a follower slidingly mounted between the rollers, wherein the follower comprises a via through which the tether is paid out or taken in such that any vertical motion of the tether will cause the angle arm assembly to pivot about the axis of rotation, and any horizontal motion causes the follower to move horizontally.

* * * * *